Jan. 8, 1924.
M. A. WALSH
1,480,321
ADJUSTABLE SPOTLIGHT
Filed Sept. 28, 1922
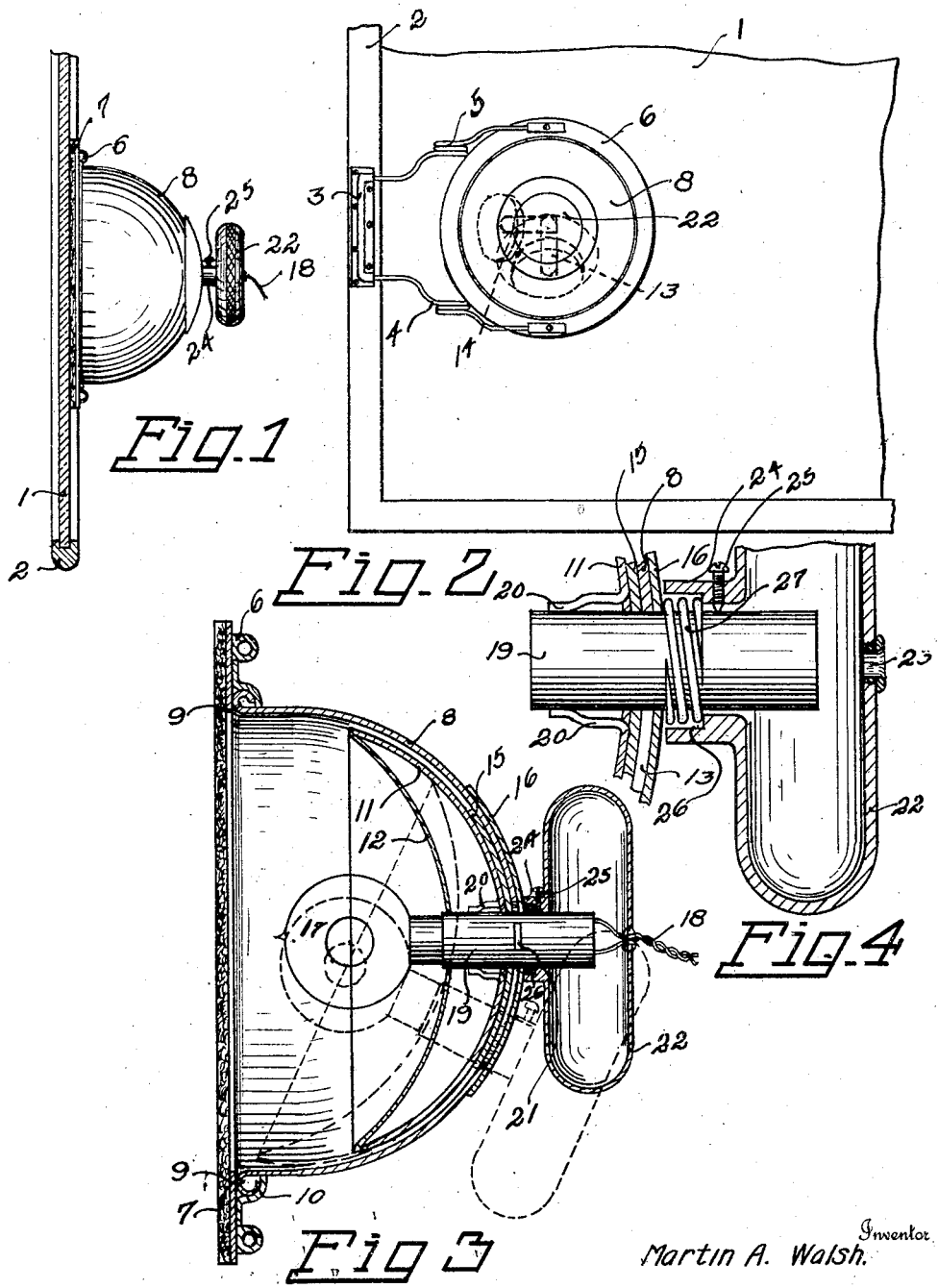
Inventor
Martin A. Walsh.

Patented Jan. 8, 1924.

1,480,321

UNITED STATES PATENT OFFICE.

MARTIN A. WALSH, OF MARMARTH, NORTH DAKOTA.

ADJUSTABLE SPOTLIGHT.

Application filed September 28, 1922. Serial No. 591,072.

*To all whom it may concern:*

Be it known that I, MARTIN A. WALSH, a citizen of the United States, residing at Marmarth, in Slope County and State of North Dakota, have invented certain new and useful Improvements in Adjustable Spotlights, of which the following is a specification.

My present invention relates to improvements in adjustable spotlights for use on vehicles such as automobiles, motor boats, motor trucks and other vehicles of this type. In the accompanying drawings I have illustrated, and throughout the specification I have described and referred to the device as adapted for use on the windshield of an automobile, but this limitation of its use is merely for convenience of description, and it will be understood that I do not confine the use of the device solely to this one example.

The primary object of the invention is the provision of a spotlight supported from the windshield of a vehicle and utilizing the transparent windshield as a guard and protection for the lamp, as well as for the lens of the lamp through which the light rays may be directed, from the reflector of the lamp.

In carrying out my invention I utilize an electric lamp with an adjustable light reflector, together with an adjustable lamp body, for the purpose of securing a wide range of adjustment for directing the light rays over a comparatively large area.

The invention consists in certain novel combinations and arrangements of parts as will be hereinafter more fully described and claimed. In the accompanying drawings I have illustrated one complete example of the physical embodiment of my invention wherein the parts are combined and arranged according to the best mode I have thus far devised for the practical application of the principles of my invention.

Figure 1 is a side view of the device of the invention applied to a transparent window shield which is shown in section.

Figure 2 is a view in rear elevation of the lamp or spotlight applied to the window shield.

Figure 3 is an enlarged, vertical sectional view of the lamp, and Figure 4 is an enlarged detail view showing the lamp socket and handle connection.

In the preferred form of the invention as shown in the drawings I have designated as 1 the wind shield having the usual frame 2 which is adapted for use either with automotive vehicles or watercraft. The spotlight is adapted to be attached to and supported from one of the side bars of the windshield frame, and for this purpose an attaching plate 3 is secured in suitable manner to the side bar, or other member of the frame. The horizontally disposed bracket is supported in the attaching plate and comprises a pair of arms 5, spaced the proper distance apart, and each arm is fashioned with a spring coil 5. At the ends of the arms they are attached to a retaining ring 6 which has a felt or other cushioned gasket 7 affixed thereto for frictional contact with the face of the windshield 1.

The housing or outer casing for the lamp is in the form of a hemi-spherical shell 8 having an annular, exterior rib 9 around its open end, and by means of the complementary annular flange 10 of the retaining plate or ring 6 which encloses this rib the housing is held in proper relation to the windshield. In Fig. 3 it will be seen that the rib 9 is retained between the flange 10 and the inner edge of the cushioned gasket 7, and the resilient bracket arms with their spring coils hold the device against the windshield, the gasket acting as an anti-rattler. However, the frictional contact of the retaining flange and gasket on the rib is such as to permit the housing to be rotated on its axis, and to hold the housing in such adjusted position, in order to secure various adjustments of the spotlight as will be explained.

Within the housing or outer casing of the lamp is enclosed an adjustable reflector-holder 11 that carries the reflector 12, these parts conforming to the interior of the housing and the reflector having an efficient reflecting surface for directing light rays. The reflector and its holder are capable of adjustment in two planes through the use of a vertical slot 13 and a lateral slot 14, arranged at right angles in the lamp housing, and a pair of guide plates 15 and 16 are attached to the holder, or move therewith as the reflector-holder is adjusted. The inner guide plate 15 moves in contact with the inner surface of the housing and the outer guide plate 16 covers the slots in the housing and moves in contact with the exterior surface of the housing.

The electric light bulb 17, as the source of light is properly located in the housing and is movable with the adjustable reflector and its holder, the wires 18 to the bulb being introduced through a socket-sleeve 19.

The sleeve 19 is located in openings in the walls of the reflector, holder, and guide plates, and is movable through the angularly disposed slots of the housing. Within the holder are arranged a series of frictional fingers or spring tongues 20, surrounding the socket sleeve 19, and engaging the sleeve with sufficient friction to hold the sleeve, and the bulb supported by the sleeve, in adjusted position. The sleeve is designed to be moved through the limits of the two slots 13 and 14, it may be milled, as at 21 on its exterior for engagement with the walls of the slots to prevent turning of the sleeve with relation to the holder and reflector.

It will thus be apparent that the holder, reflector, lamp bulb and its socket-sleeve, together with the guide plates are movable and guided by the slots, with relation to the housing. For this movement I employ a hollow handle or knob 22 having an outlet opening 23 for the electric wires, and a sleeve 24 to encase the socket-sleeve 19, a set screw 25 being utilized to secure the two sleeve members together.

The handle-sleeve is countersunk at 26 to form a recess for an anti-rattler spring 27 coiled about the socket-sleeve and bearing against the outside guide plate or cover plate 16.

From the above description, taken in connection with my drawings it will be apparent that the source of light or bulb 17 remains in the same relative position with respect to the reflector, and that the reflector may be moved either at an angle to the vertical, or at an angle to the horizontal, and when the reflector is located in either of these two adjusted positions, the reflector and its housing may be turned bodily in a vertical plane or in a plane transverse to the axis of the housing. In this manner a comparatively wide range of adjustment, as indicated by the dotted line positions in Figures 2 and 3, may be secured for the spotlight in order that the light rays or light beam may be directed or projected through a wide area.

While I have illustrated and described one exemplification of my invention, it will be understood that changes and alterations may be made within the structure as shown, which come within the scope of my appended claims.

Having thus fully described my invention, what I claim as new and desire to secure by Letters Patent is:—

1. In combination with a vehicle having a windshield thereon, of a lamp within said vehicle comprising a retaining ring adapted to be held against the surface of said windshield, a housing rotatably supported by said ring and means for rotating said housing, said windshield adapted to serve as a closure for the housing and ring, a reflector associated with said housing for varying the direction of rays projected therefrom through said windshield, and means for securing said reflector in adjusted position with respect to the housing.

2. The combination with a windshield or the like of a resilient bracket supported thereon, a retaining ring carried by the bracket and adapted to be held against the surface of the windshield, a housing rotatably supported by the ring, an adjustable reflector within and movable relatively to the housing, a lamp within the reflector, and means for adjusting said housing and reflector.

3. The combination with a windshield and spring bracket thereon, of a retaining ring carried by the bracket and adapted to be held against the surface of the windshield, a housing rotatably supported by the ring and provided with angularly disposed slots, an adjustable reflector within the housing, a socket sleeve connected with the reflector and movable in said slots, a lamp in the socket sleeve, a handle on the sleeve, and connections between said sleeve and housing whereby the latter may be rotated.

4. The combination with a windshield and spring bracket thereon, of a retaining ring carried by the bracket and adapted to be held against the surface of the windshield, a housing rotatably supported by the ring and provided with intersecting slots, an adjustable holder and reflector within the housing, a socket sleeve movable in said slots and a series of frictional fingers on said holder engaging said sleeve, a lamp in the socket sleeve, a knob on said sleeve, an exterior guard plate movable with said holder, and an anti-rattling spring interposed between said plate and knob.

In testimony whereof, I affix my signature.

MARTIN A. WALSH.